(12) United States Patent
Yokoyama et al.

(10) Patent No.: US 11,682,806 B2
(45) Date of Patent: Jun. 20, 2023

(54) BATTERY STACK STRUCTURE

(71) Applicant: SUBARU CORPORATION, Tokyo (JP)

(72) Inventors: Yutaka Yokoyama, Tokyo (JP); Kazuki Sakai, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 147 days.

(21) Appl. No.: 17/119,120

(22) Filed: Dec. 11, 2020

(65) Prior Publication Data

US 2021/0296720 A1    Sep. 23, 2021

(30) Foreign Application Priority Data

Mar. 18, 2020 (JP) .............................. JP2020-047614

(51) Int. Cl.
| | |
|---|---|
| *H01M 10/6556* | (2014.01) |
| *H01M 10/613* | (2014.01) |
| *H01M 10/625* | (2014.01) |
| *H01M 10/6561* | (2014.01) |
| *H01M 10/647* | (2014.01) |
| *H01M 10/6562* | (2014.01) |
| *H01M 50/507* | (2021.01) |
| *H01M 50/284* | (2021.01) |
| *H01M 50/249* | (2021.01) |
| *H01M 50/509* | (2021.01) |

(52) U.S. Cl.
CPC ..... *H01M 10/6556* (2015.04); *H01M 10/613* (2015.04); *H01M 10/625* (2015.04); *H01M 10/6561* (2015.04); *H01M 50/507* (2021.01); *H01M 2220/20* (2013.01)

(58) Field of Classification Search
None
See application file for complete search history.

(56) References Cited

U.S. PATENT DOCUMENTS

| | | | |
|---|---|---|---|
| 2012/0237804 A1* | 9/2012 | Yoon | H01M 10/617 429/72 |
| 2014/0072835 A1* | 3/2014 | Tsujimura | H01M 10/6562 429/7 |
| 2016/0211561 A1* | 7/2016 | Nakagawa | H01M 10/613 |

(Continued)

FOREIGN PATENT DOCUMENTS

| | | | |
|---|---|---|---|
| JP | 2013-080625 A | | 5/2013 |
| JP | 2015-012628 A | | 1/2015 |
| JP | 2015-149212 | * | 8/2015 |

*Primary Examiner* — Lisa S Park

(74) *Attorney, Agent, or Firm* — Smith, Gambrell & Russell, LLP

(57) ABSTRACT

A battery stack structure includes a battery stack, a passage, a junction box, and a bus bar. The battery stack includes spaced battery cells. The passage is adjacent to a first side of the battery stack. The passage allows air to flow in the passage before the air cools the battery stack. The junction box is adjacent to a second side of the battery stack. The junction box allows the air to flow in the junction box after the air has cooled the battery stack. The junction box contains an electronic device. The bus bar is contained in the junction box and is electrically and thermally coupled to the electronic device. The bus bar allows passing of current. The direction of the flow of the air flowing from the battery stack faces a major surface of the bus bar.

19 Claims, 7 Drawing Sheets

(56) References Cited

U.S. PATENT DOCUMENTS

2017/0133722 A1*  5/2017  Kim .................... H01M 10/441
2019/0115703 A1*  4/2019  Kawaguchi ........ H01R 13/6461
2019/0318892 A1*  10/2019  Ikejiri ................. H01M 10/625

* cited by examiner

BATTERY STACK STRUCTURE

CROSS-REFERENCE TO RELATED APPLICATIONS

The present application claims priority from Japanese Patent Application No. 2020-047614 filed on Mar. 18, 2020, the entire contents of which are hereby incorporated by reference.

BACKGROUND

The disclosure relates to a battery stack structure and, in particular, relates to a battery stack structure including a cooling mechanism.

In general, an onboard battery houses a lot of plate-shaped battery cells. Japanese Unexamined Patent Application Publication (JP-A) No. 2013-80625 discloses such type of onboard battery.

For example, a battery module disclosed in JP-A No. 2013-80625 includes multiple unit battery cells having external terminals that are mutually electrically coupled by a bus bar. The battery module also includes a heat transmission cover that covers the bus bar in direct contact with the bus bar. The heat transmission cover is an insulative heat conductive member and is in direct contact with a battery container of the unit battery cell. With this structure, heat that is generated in an electrode group is efficiently transmitted to a surface of the battery container in charging and discharging. Thus, the unit battery cell is effectively cooled, and the battery module can be reduced in dimensions.

JP-A No. 2015-012628 discloses a cooling unit for cooling a battery cell and its peripheral device of an onboard battery. According to JP-A No. 2015-012628, an electronic component passage is formed in a junction box. The electronic component passage makes a battery cooling passage communicate with the outside of the junction box. With this structure, after air that flows into a battery case passes through the battery cooling passage to cool a battery, the air passes through the electronic component passage to cool an electronic component and is then discharged to the outside of the junction box.

SUMMARY

An aspect of the disclosure provides a battery stack structure including a battery stack, a cooling air introduction passage, a junction box, and a bus bar. The battery stack includes multiple battery cells that are spaced from each other. The cooling air introduction passage is adjacent to a first side of the battery stack. The cooling air introduction passage is configured to allow air to flow in the cooling air introduction passage before the air cools the battery stack. The junction box is adjacent to a second side of the battery stack. The junction box is configured to allow the air to flow in the junction box after the air has cooled the battery stack. The junction box contains an electronic device. The bus bar is contained in the junction box. The bus bar is electrically and thermally coupled to the electronic device. The bus bar is configured to allow passing of current that is charged to or discharged from the battery stack. The direction of the flow of the air flowing from the battery stack into the junction box faces a major surface of the bus bar.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to explain the principles of the disclosure.

FIG. 3A is a perspective view illustrating a junction box. FIG. 3B is a side view illustrating the junction box.

FIG. 5A is a perspective view illustrating the battery stack structure. FIG. 5B is a sectional view illustrating the battery stack structure.

FIG. 6A is a perspective view partially illustrating the junction box. FIGS. 6B and 6C are perspective views illustrating the junction box of another embodiment.

FIG. 7A is a perspective view partially illustrating the junction box. FIG. 7B is a side view illustrating the junction box.

DETAILED DESCRIPTION

The cooling structure disclosed in JP-A No. 2015-012628 has a possibility of improvement from a point of view of efficiency of cooling the electronic component in the junction box. In the state in which this cooling efficiency is insufficient, an expensive electronic component having a large heat capacity is employed, causing increase in cost.

On the other hand, due to recent progress in reduction in dimensions of an onboard battery, a battery stack may be disposed in a small space in a vehicle or in a space where flowability of air is low, in some cases. This makes it more difficult to improve the cooling efficiency of the battery stack.

Measures against these issues include employing a high rated relay, increasing a cross sectional area of a bus bar to enhance cooling efficiency, and reducing output current based on a measured temperature value of a relay. However, these measures may cause another issue such as increase in dimensions of the whole battery pack or reduction in output from the battery pack.

It is desirable to provide a battery stack structure configured to effectively cool an electronic device in a junction box.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following embodiment which are not recited in a most-generic independent claim of the disclosure are optional and may be provided on an as-needed basis. The drawings are schematic and are not intended to be drawn to scale.

Throughout the present specification and the drawings, elements having substantially the same function and configuration are denoted with the same numerals to avoid any redundant description.

Figure 1:
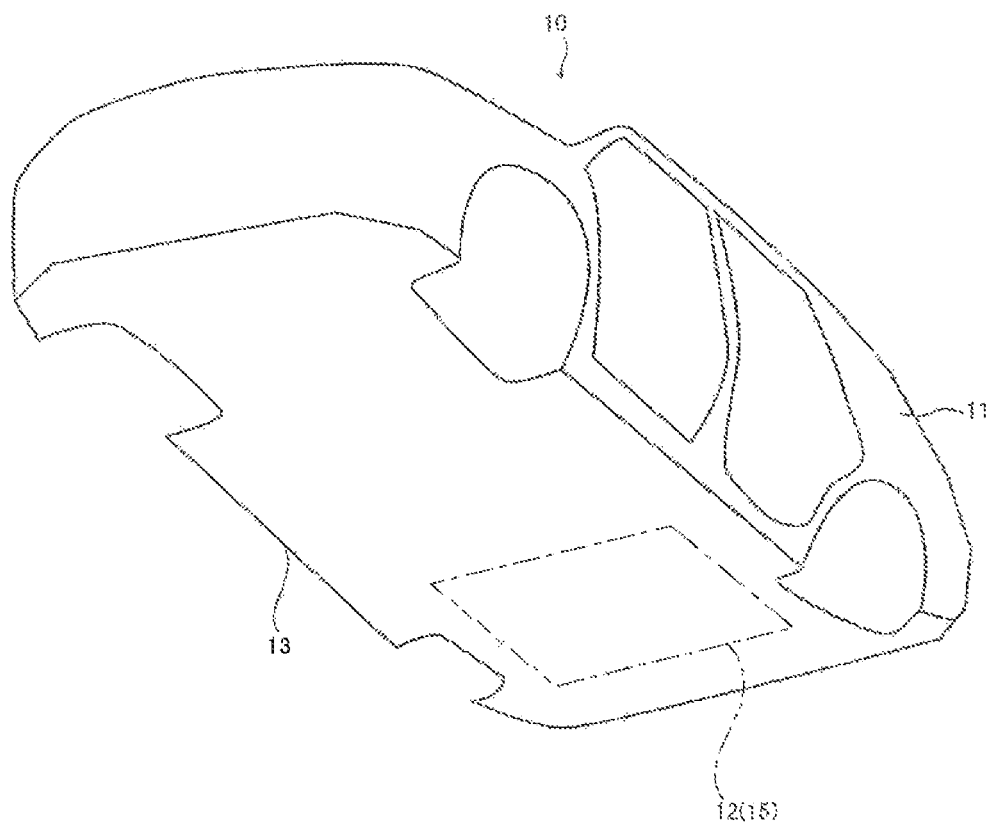
FIG. 1 is a perspective view illustrating a vehicle that has a battery stack structure according to an embodiment of the disclosure.

FIG. 1 is a perspective view of a vehicle 10 that is mounted with a battery stack structure 15 according to an embodiment, as viewed from below.

The vehicle 10 is, for example, an automobile or a train, and is mounted with the battery stack structure 15, which will be described later. The battery stack structure 15 is used for supplying power to various electric components, such as a motor. Examples of the vehicle 10 include an electrical vehicle (EV), a hybrid electrical vehicle (HEV), and a plug-in hybrid electrical vehicle (PHEV).

The vehicle 10 includes a vehicle body 11, the multiple battery stack structures 15, a driving motor (not illustrated), and tires (not illustrated). The battery stack structures 15 are disposed in a battery disposition region 12 that is specified in the vicinity of a bottom surface 13 of the vehicle 10. The driving motor is driven by power supplied from the battery stack structure 15. The tires rotate by a driving force of the driving motor.

The multiple battery stack structures 15, which will be described later, are disposed in matrix in the battery disposition region 12. The battery stack structure 15 has, for example, an approximately rectangular parallelpiped shape.

The multiple battery stack structures 15, which are efficiently disposed in the battery disposition region 12, extends a continuous travel distance of the vehicle 10.

Figure 2:
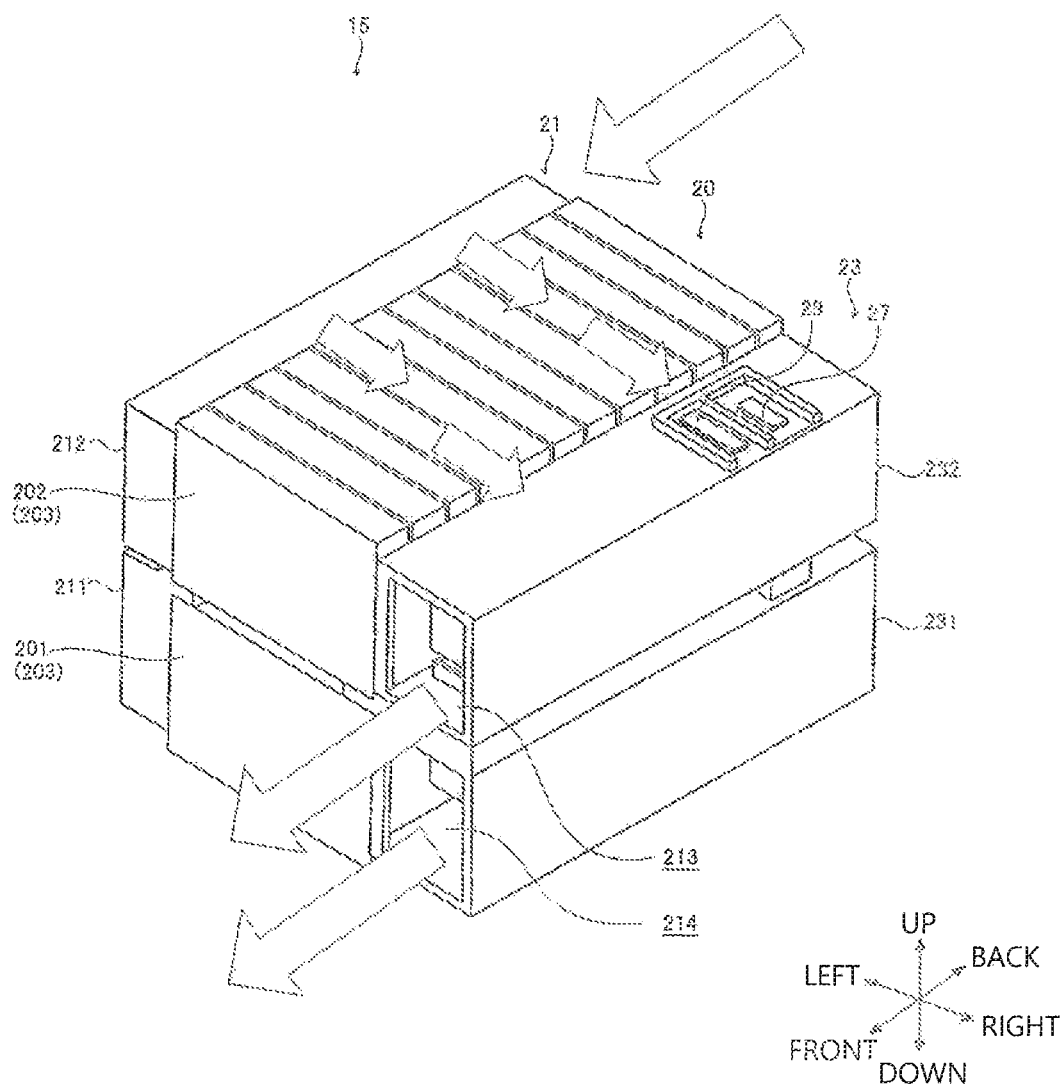
FIG. 2 is a perspective view illustrating the battery stack structure according to the embodiment of the disclosure.

FIG. 2 is a perspective view of the battery stack structure 15, as viewed from above on the front side. The battery stack structure 15 mainly includes a battery stack 20, a cooling air introduction passage 21, and a junction box 23.

The following description uses each of an up-down direction, a front-back direction, and a right-left direction. The up-down direction is a direction of stacking a lower battery stack 201 and an upper battery stack 202 that constitute the battery stack 20. The front-back direction is a direction of stacking battery cells 203 that constitute the upper battery stack 202. The right-left direction is a direction of disposing the cooling air introduction passage 21 and the junction box 23 to the battery stack 20. Each direction used in FIG. 2 and the subsequent drawings may not correspond to each direction of the vehicle 10 illustrated in FIG. 1.

The battery stack 20 is disposed at the center in the right-left direction of the battery stack structure 15 and includes the lower battery stack 201 and the upper battery stack 202.

The lower battery stack 201 includes multiple battery cells 203 that are spaced along the front-back direction. The battery cell 203 is a secondary battery, such as a nickel hydrogen battery or a lithium ion battery, and each of the battery cells 203 has an approximately plate shape. This embodiment is configured to allow air to flow in the spaces between the battery cells 203 from the left to the right, whereby the battery cells 203 are effectively cooled.

As in the case of the lower battery stack 201, the upper battery stack 202 also includes multiple battery cells 203.

The cooling air introduction passage 21 is disposed on the left of the battery stack 20, and air before cooling the battery stack 20 flows in the cooling air introduction passage 21. The cooling air introduction passage 21 includes a lower cooling air introduction passage 211 and an upper cooling air introduction passage 212. The lower cooling air introduction passage 211 is disposed on the left of the lower battery stack 201. The upper cooling air introduction passage 212 is disposed on the left of the upper battery stack 202. The cooling air introduction passage 21 may also be referred to as a "duct".

The lower cooling air introduction passage 211 is an approximately box-shaped body that is made of synthetic resin and that has an approximately rectangular parallelpiped shape as a whole. The lower cooling air introduction passage 211 has a back opening on a back surface and has a right opening on a right side surface. The back opening and the right opening are not illustrated herein. Air is supplied from the outside and advances forward in the lower cooling air introduction passage 211 via the back opening of the lower cooling air introduction passage 211. Then, the air that enters the lower cooling air introduction passage 211 is introduced into the space between the battery cells 203, which constitute the lower battery stack 201, via the right opening.

As in the case of the lower cooling air introduction passage 211, the upper cooling air introduction passage 212 also has a back opening and a right opening, which are not illustrated herein. Air is supplied from the outside and advances forward in the upper cooling air introduction passage 212 via the back opening of the upper cooling air introduction passage 212. Then, the air that enters the upper cooling air introduction passage 212 is introduced into the space between the battery cells 203, which constitute the upper battery stack 202, via the right opening.

The junction box 23 is disposed on the right of the battery stack 20 and houses an electronic device 22 and a bus bar 24 that is electrically and thermally coupled to the electronic device 22. The electronic device 22 will be described later. Air after cooling the battery stack 20 flows in the junction box 23. The junction box 23 has a lower junction box 231 and an upper junction box 232 that are arranged in a stacked manner.

The lower junction box 231 has an opening on a left side surface and has an opening on a front side surface. Herein, the left opening is not illustrated, but the front opening 214 is illustrated. Air after cooling each of the battery cells 203 of the lower battery stack 201 enters the lower junction box 231 from the left opening of the lower junction box 231 and advances forward in the lower junction box 231 to be discharged to the outside from the opening 214. This allows the air to effectively cool a lower bus bar 241 and electronic devices 22 that are disposed in the lower junction box 231. The lower bus bar 241 and the electronic device 22 will be described later.

The upper junction box 232 also has a structure and a function that are similar to those of the lower junction box 231. That is, the upper junction box 232 has an opening on a left side surface and an opening on a front side surface. Herein, the left opening is not illustrated, but the front opening 213 is illustrated. Air after cooling each of the battery cells 203 of the upper battery stack 202 enters the upper junction box 232 from the left opening of the upper junction box 232 and advances forward therein to be discharged to the outside from the opening 213. This allows the air to effectively cool an upper bus bar 242 and an electronic device 22 that are disposed in the upper junction box 232. The upper bus bar 242 and the electronic device 22 will be described later.

Figure 3A:
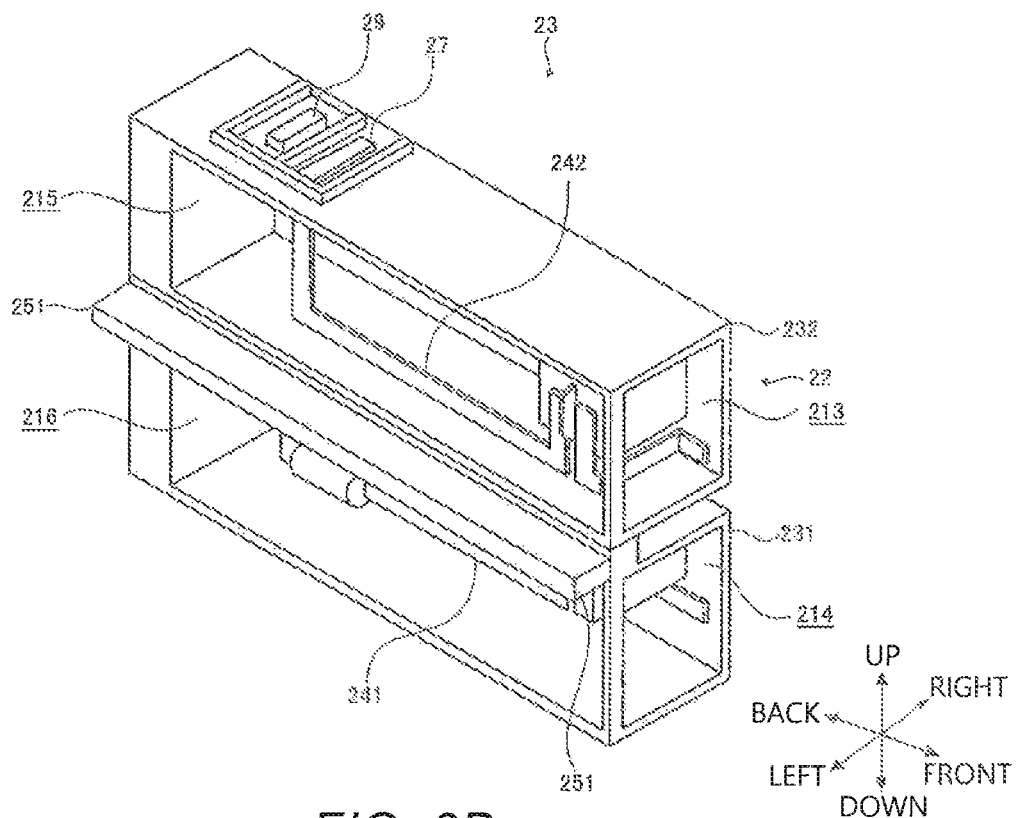
FIGS. 3A and 3B illustrate the battery stack structure according to the embodiment of the disclosure.
Figure 3B:
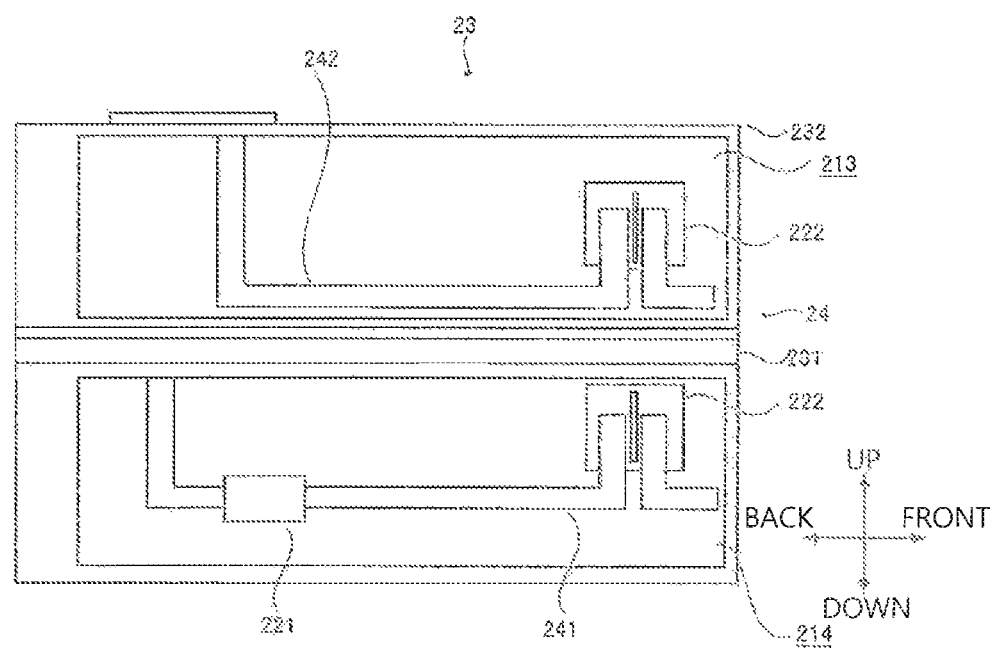

FIGS. 3A and 3B illustrate the battery stack structure 15. FIG. 3A is a perspective view illustrating the junction box 23. FIG. 3B is a side view illustrating the junction box 23.

With reference to FIGS. 3A and 3B, the lower junction box 231 has the opening 214 that opens to the front and also has an opening 216 that opens to the left. In the lower junction box 231, the lower bus bar 241 having an approximately plate shape extending in the front-back direction is disposed. As illustrated in FIG. 3B, a fuse 221 and a main relay 222 as electronic devices 22 are interposed in the lower bus bar 241. In this example, the lower bus bar 241 is made of, e.g., a plate-shaped copper or a plate-shaped aluminum, and the lower bus bar 241 is disposed in the lower junction box 231 in such a manner that its major surfaces being the largest surfaces face the left direction and the right direction. The lower bus bar 241 is coupled to, for example, a negative electrode of the battery stack 20 illustrated in FIG. 2. In this example, the lower bus bar 241 is electrically and thermally coupled to the fuse 221 and the main relay 222.

The structure, such as the inside structure, of the upper junction box 232 is similar to that of the lower junction box 231. That is, the upper junction box 232 has the opening 213 that opens to the front and also has an opening 215 that opens to the left. In the upper junction box 232, the upper bus bar 242 having an approximately plate shape extending in the front-back direction is disposed. As illustrated in FIG. 3B, a main relay 222 is interposed in the upper bus bar 242. The upper bus bar 242 is made of, e.g., a plate-shaped copper or a plate-shaped aluminum, and the upper bus bar 242 is disposed in the upper junction box 232 in such a manner that its major surfaces being the largest surfaces face the left direction and the right direction. The upper bus bar 242 is coupled to, for example, a positive electrode of the battery stack 20 illustrated in FIG. 2. The upper bus bar 242 is electrically and thermally coupled to the main relay 222.

As described above, the lower bus bar 241, which is coupled to the negative electrode of the battery stack 20, is contained in the lower junction box 231, whereas the upper bus bar 242, which is coupled to the positive electrode of the battery stack 20, is contained in the upper junction box 232. Thus, the lower bus bar 241 of the negative electrode and the upper bus bar 242 of the positive electrode are separated from each other. This enables preventing a short circuit between the lower bus bar 241 and the upper bus bar 242 when a collision accident of the vehicle 10 occurs. Moreover, as viewed from above the junction box 23, the lower bus bar 241 and the upper bus bar 242 can be disposed in an overlapping manner, whereby the area for disposing the bus bar 24 can be reduced.

As illustrated in FIG. 3B, the main relay 222 is disposed on a front side of the upper junction box 232, that is, disposed a downstream side along the flow of air in the upper junction box 232. Thus, the main relay 222 is effectively cooled by flow of air, in addition to the heat transmitting function of the upper bus bar 242. This feature is also obtained by the lower junction box 231.

Figure 4:
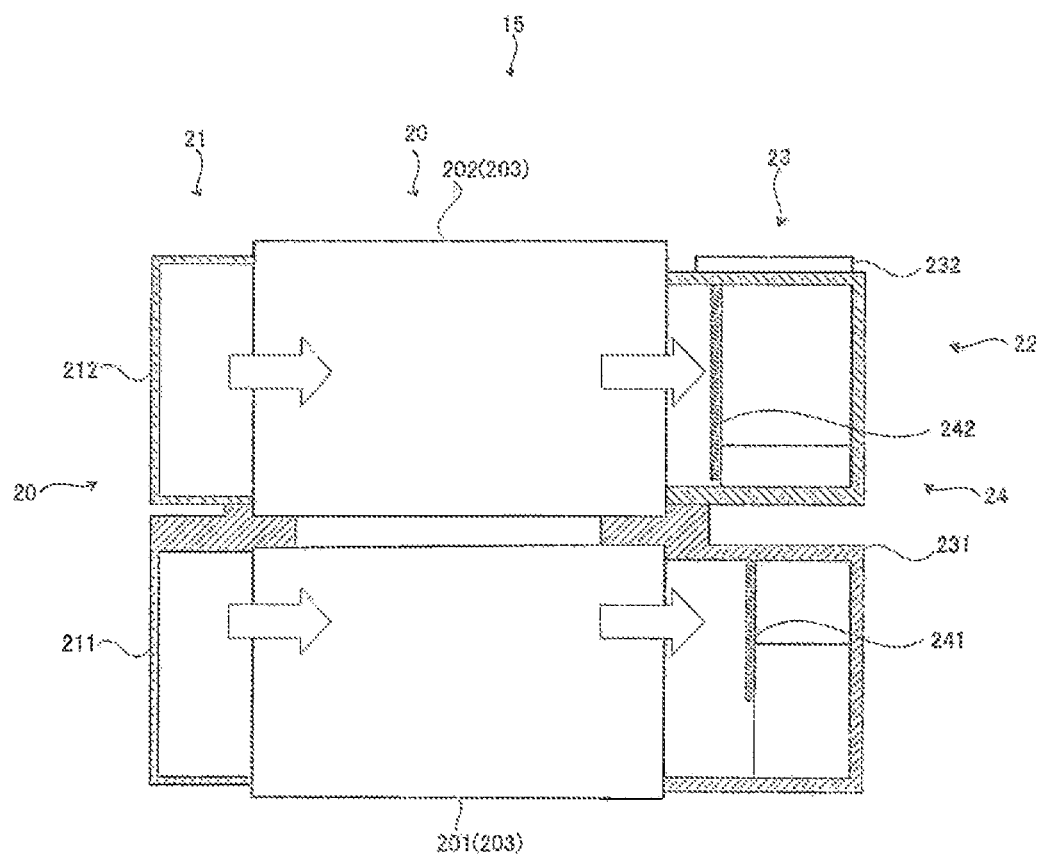
FIG. 4 is a sectional view illustrating the battery stack structure according to the embodiment of the disclosure.
Figure 4:
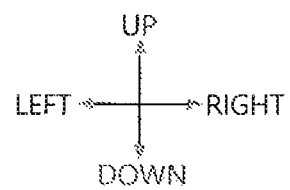

FIG. 4 is a sectional view illustrating the battery stack structure 15. The flow of air in the battery stack structure 15 will be described with reference to this drawing. Herein, the flow of air in the battery stack structure 15 is illustrated by arrows.

Air is introduced into the lower battery stack 201 from the lower cooling air introduction passage 211. Then, after cooling each of the battery cells 203 of the lower battery stack 201, the air is introduced into the lower junction box 231. The temperature of the air after cooling the battery cells 203 of the lower battery stack 201 is, for example, in a range of 40 to 50° C. On the other hand, the temperature of the lower bus bar 241 that is heated by passing current from the battery stack 20, is for example, approximately 70° C. In these conditions, the air after cooling the lower battery stack 201 exchanges heat with the lower bus bar 241. This effectively cools the lower bus bar 241, and the fuse 221 (see FIG. 3B) and the main relay 222 (see FIG. 3B), which are thermally coupled to the lower bus bar 241. Moreover, air that flows between the battery cells 203 is straightened, as well as the flow rate of this air is adjusted, whereby the battery cells 203 are uniformly cooled.

In this embodiment, the direction of the flow of air that flows from the lower battery stack 201 into the lower junction box 231, faces the major surface of the lower bus bar 241. In more detail, after cooling the battery cells 203 of the lower battery stack 201, the air is sent in such a manner as to perpendicularly hit against a left major surface of the lower bus bar 241. As a result, the air actively exchanges heat with the lower bus bar 241 to effectively cool the whole lower bus bar 241. The air after exchanging heat with the lower bus bar 241 is discharged to the outside via the opening 214 illustrated in FIG. 3A.

Heat exchange in the upper junction box 232 is similar to that in the lower junction box 231. That is, air is introduced into the upper battery stack 202 from the upper cooling air introduction passage 212. Then, after cooling each of the battery cells 203 of the upper battery stack 202, the air is introduced into the upper junction box 232. The air after cooling the upper battery stack 202 exchanges heat with the upper bus bar 242. This effectively cools the upper bus bar 242 and the main relay 222 (FIG. 3B), which is thermally coupled to the upper bus bar 242.

Also in the upper junction box 232, the direction of the flow of air that flows from the upper battery stack 202 into the upper junction box 232 faces the major surface of the upper bus bar 242. As a result, the air actively exchanges heat with the upper bus bar 242 to effectively cool the whole upper bus bar 242. The air after exchanging heat with the upper bus bar 242 is discharged to the outside via the opening 213 illustrated in FIG. 3A.

Figure 5A:
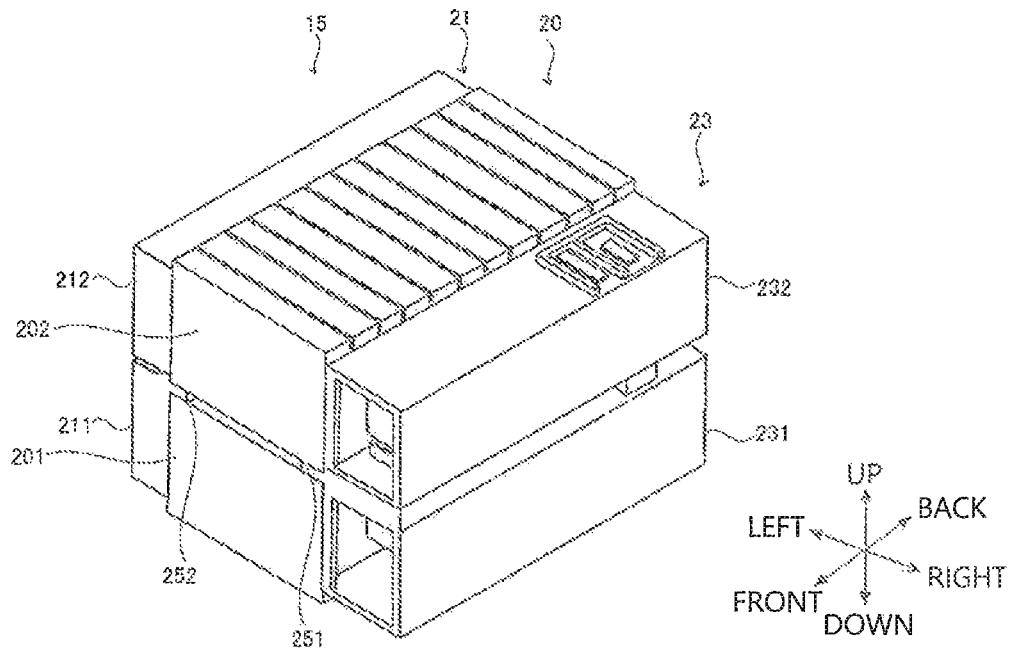
FIGS. 5A and 5B illustrate the battery stack structure according to the embodiment of the disclosure.
Figure 5B:
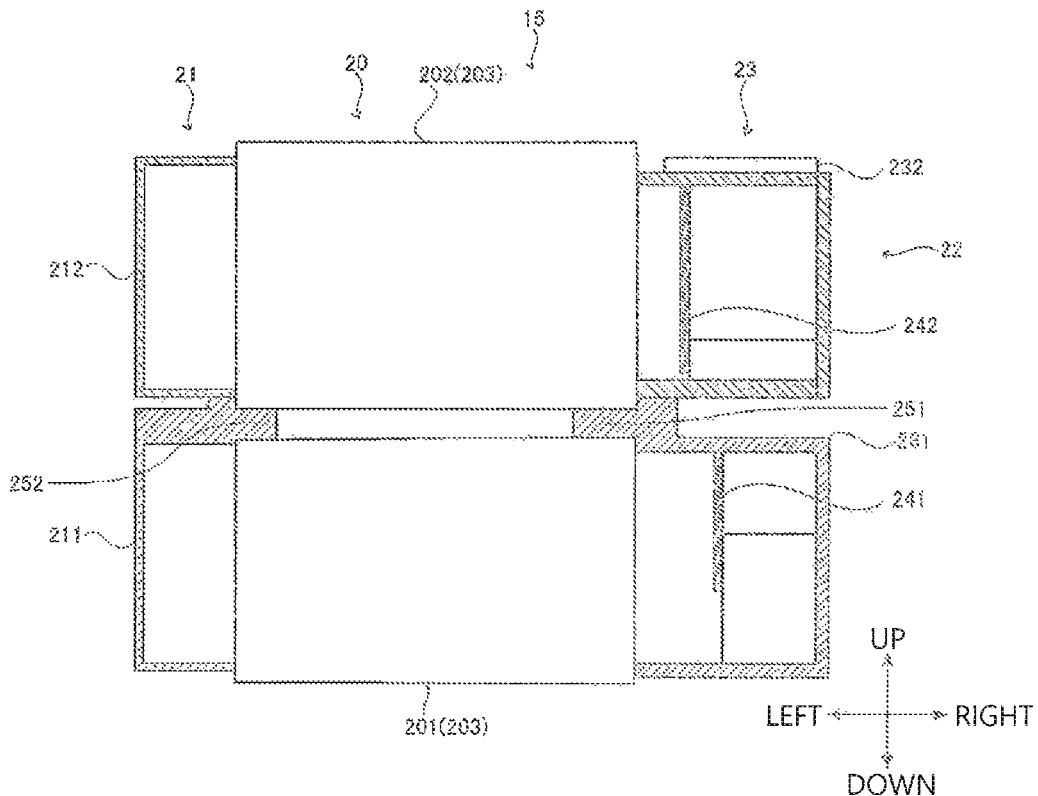

FIGS. 5A and 5B illustrate the battery stack structure 15. FIG. 5A is a perspective view illustrating the battery stack structure 15. FIG. 5B is a sectional view illustrating the battery stack structure 15.

With reference to FIGS. 5A and 5B, a right upper end part of the lower cooling air introduction passage 211 protrudes rightwards, to form a positioning unit 252. The positioning unit 252 may be formed continuously from a front end to a back end of the lower cooling air introduction passage 211. Alternatively, multiple positioning units 252 may be formed in a separated manner from the front end to back end of the lower cooling air introduction passage 211. An upper surface of the positioning unit 252 is in contact with a lower surface left end side of the upper battery stack 202, whereas a lower surface of the positioning unit 252 is in contact with an upper surface left end side of the lower battery stack 201. A lower end of a left side surface of the upper battery stack 202 is in contact with a side surface that is formed at an upper part of a root of the positioning unit 252. Moreover, a left side surface of the lower battery stack 201 is in contact with a right side surface of the lower cooling air introduction passage 211.

With reference to FIGS. 5A and 5B, a left upper end part of the lower junction box 231 protrudes leftwards, to form a positioning unit 251. The positioning unit 251 may be formed continuously from a front end to a back end of the lower junction box 231. Alternatively, multiple positioning units 251 may be formed in a separated manner from the front end to back end of the lower junction box 231. An upper surface of the positioning unit 251 is in contact with a lower surface right end side of the upper battery stack 202, whereas a lower surface of the positioning unit 251 is in contact with an upper surface right end side of the lower battery stack 201. A lower end of a right side surface of the upper battery stack 202 is in contact with a side surface that is formed at an upper part of a root of the positioning unit 251. Moreover, a right side surface of the lower battery stack 201 is in contact with a left side surface of the lower cooling air introduction passage 211.

As described above, the positioning unit 252 is formed on the lower cooling air introduction passage 211, whereas the positioning unit 251 is formed on the lower junction box 231.

This enables exactly specifying the relative position between the lower battery stack 201 and the upper battery stack 202 in the up-down direction and in the right-left direction. In addition, a dedicated part for positioning is not used, whereby it is possible to simplify the whole structure of the battery stack structure 15.

Figure 6A:
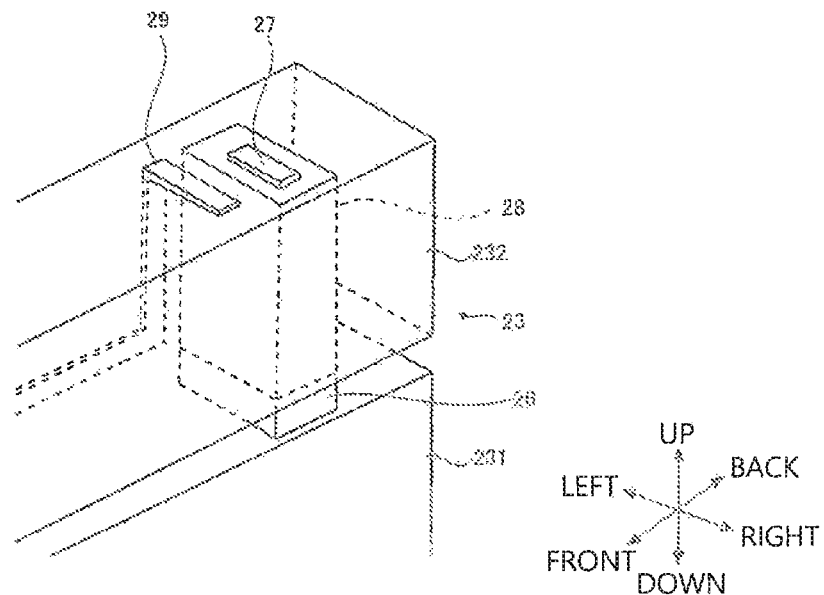
FIGS. 6A to 6C illustrate the battery stack structure according to the embodiment of the disclosure.
Figure 6B:
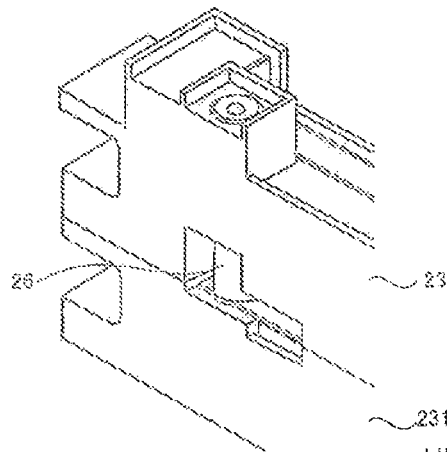
Figure 6C:
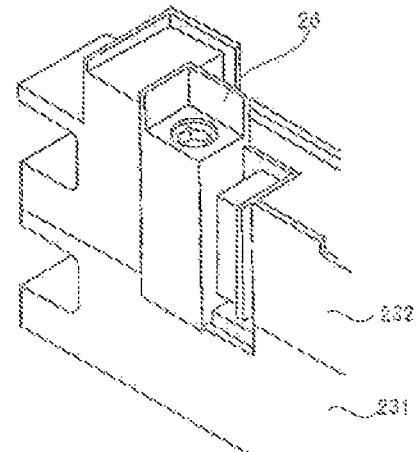

FIGS. 6A to 6C illustrate the battery stack structure 15. FIG. 6A is a perspective view partially illustrating the junction box 23. FIGS. 6B and 6C are perspective views illustrating the junction box 23 of another embodiment.

With reference to FIG. 6A, a part of the lower junction box 231 protrudes upwardly so as to have an approximately rectangular parallellpiped shape, so that a protrusion 26 is formed. Moreover, a terminal 27 is formed in the protrusion 26. The terminal 27 is exposed to an upper surface of the protrusion 26 and is coupled to the lower bus bar 241 contained in the lower junction box 231.

A terminal 29 is formed in the vicinity of the terminal 27, on an upper surface of the upper junction box 232. The terminal 29 is coupled to the upper bus bar 242 illustrated in FIG. 5B. For example, the terminal 27 is a negative electrode terminal of the battery stack structure 15, whereas the terminal 29 is a positive electrode terminal of the battery stack structure 15.

A recess 28 is formed in such a manner as to partially penetrate the upper junction box 232 in the up-down direction. The protrusion 26 of the lower junction box 231 is inserted into the recess 28 of the upper junction box 232. With this structure, the terminal 27, which is coupled to the lower bus bar 241 of the lower junction box 231, is led onto the upper surface of the upper junction box 232. Moreover, the protrusion 26 is inserted and fitted in the recess 28, which structure enables easy positioning of the lower junction box 231 and the upper junction box 232. Furthermore, routing of a high voltage cable that is coupled to the lower bus bar 241 is easy, and a wiring space and a working space for wiring can be dispensed with.

With reference to FIG. 6B, in this example, a protrusion 26 is formed on an upper surface of the lower junction box 231, as a support that penetrates the upper junction box 232 in the up-down direction. This protrusion 26 as the support also enables positioning of the lower junction box 231 and the upper junction box 232.

With reference to FIG. 6C, in this example, a rectangular parallelpiped protrusion 26 having a longitudinal direction in the up-down direction is fitted to the upper junction box 232. This fitting structure also enables positioning of the lower junction box 231 and the upper junction box 232.

Figure 7A:
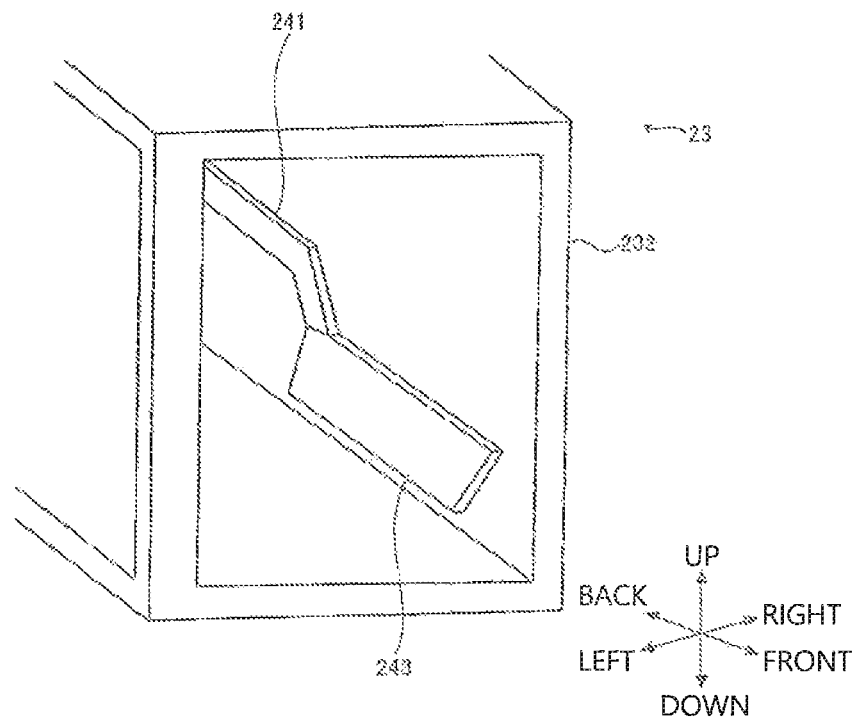
FIGS. 7A and 7B illustrate the battery stack structure according to the embodiment of the disclosure.
Figure 7B:
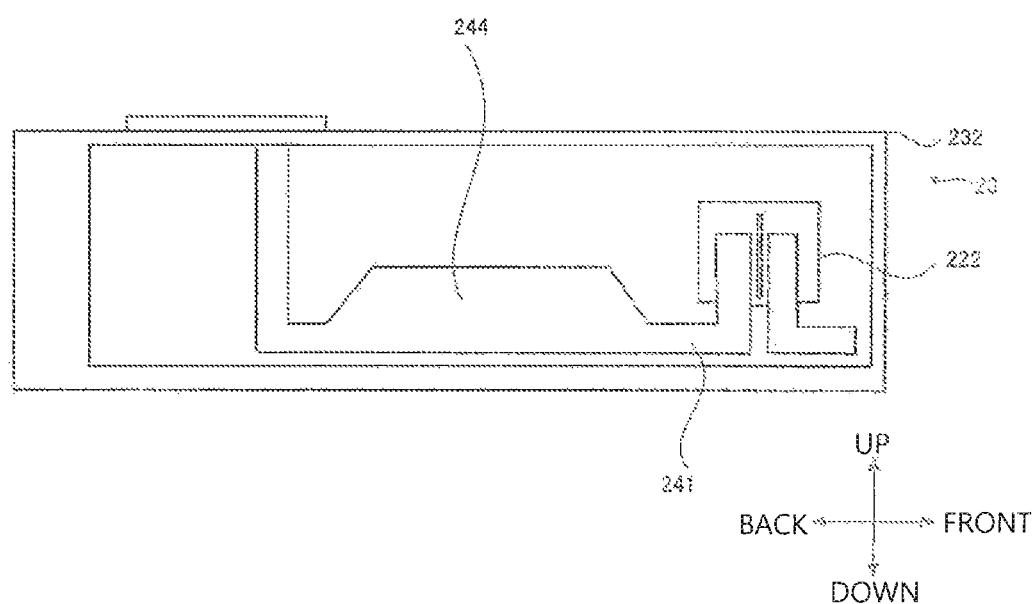

FIGS. 7A and 7B illustrate the battery stack structure 15. FIG. 7A is a perspective view partially illustrating the junction box 23. FIG. 7B is a side view illustrating the junction box 23. In this example, the surface area and the inclination of the bus bar 24 are changed in consideration of pressure loss and distribution of the flow of air that passes through the lower battery stack 201 and the upper battery stack 202. Thus, the flows of air in the lower battery stack 201 and the upper battery stack 202 are made uniform.

With reference FIG. 7A, an inclined part 243 is a part of the lower bus bar 241 that is inclined from an inner surface of the junction box 23. The inclined part 243 is inclined leftwards at its lower part. The inclined part 243 is formed so as to straighten air that passes through the lower battery stack 201 and to more suitably exchange heat with the air. As a result, the main relay 222 and the fuse 221 (refer to FIG. 3B), which are coupled to the lower bus bar 241, are more suitably cooled. The inclined part 243 may also be employed in the upper bus bar 242 illustrated in FIG. 3B.

With reference to FIG. 7B, a part of the lower bus bar 241 is widened so as to form a wide part 244. The wide part 244 is formed so that air will perpendicularly hit the maximum surface of the wide part 244, whereby the wide part 244 and the air sufficiently exchange heat with each other. As a result, the lower bus bar 241, and the main relay 222 and the fuse 221 (refer to FIG. 3B), are suitably cooled. The wide part 244 may also be employed in the upper bus bar 242 illustrated in FIG. 3B.

According to this embodiment described above, the following main effects are obtained.

In this embodiment, as illustrated in FIG. 4, the direction of the flow of air that flows from the battery stack 20 into the junction box 23 faces the major surface of the bus bar 24. This makes the air effectively exchange heat with the bus bar 24 to cool the bus bar 24 in the junction box 23, and moreover, this enables cooling the electronic device 22, which is thermally coupled to the bus bar 24. Thus, the electronic device 22 is prevented from being deteriorated in characteristic due to heating. As a result, it is possible to reduce cost of the battery stack structure 15 by employing an electronic device 22 with low specifications. Moreover, the junction box 23 itself may be used as an air passage for allowing flow of air for cooling the electronic device 22.

As illustrated in FIG. 3A, the upper bus bar 242 is disposed on an upstream side along the flow of air. This secures a long contact length of the upper bus bar 242 with relatively low temperature air, whereby the bus bar 24 is more effectively cooled by air.

The inclination of the bus bar 24, as illustrated in FIG. 7A, makes the bus bar 24 and air more actively exchange heat with each other in the junction box 23. Moreover, the flow rate of air that passes through between the battery cells 203 is adjusted by the straightening effect, whereby temperatures of the battery cells 203 are made uniform.

As illustrated in FIG. 3B it is possible to secure a long insulation distance between the lower bus bar 241 and the upper bus bar 242 that have different polarities.

As illustrated in FIG. 5A, the lower battery stack 201 and the upper battery stack 202 are positioned by the positioning units 251 and 252, which are respectively formed on the lower junction box 231 and the lower cooling air introduction passage 211. Thus, the lower battery stack 201 and the upper battery stack 202 can be exactly positioned without using a dedicated part for positioning. In addition, it is also possible to simplify the work for assembling the battery stack structure.

The protrusion 26, which contains the terminal 27, of the lower junction box 231, is inserted in the recess 28 of the upper junction box 232, as illustrated in FIG. 6A. This allows omission of a process of wiring a high voltage cable and dispenses with a wiring space and a working space, and moreover, this enables reduction in dimensions of the whole battery stack structure.

The bus bar 24 has the wide part 244, as illustrated in FIG. 7B. Thus, the wide part 244 and air effectively exchange heat with each other, whereby the bus bar 24 and the electronic component are effectively cooled.

The embodiments of the present disclosure has been described above. It is noted that the present disclosure is not limited to the above embodiments. Various modifications may be made without departing from the scope of the present disclosure. The above embodiments may be combined with each other.

In one example, in the battery stack structure 15 that is described with reference to FIG. 2, the battery stack 20 has a stacked structure including the lower battery stack 201 and the upper battery stack 202, but the battery stack 20 may simply include the lower battery stack 201. That is, the battery stack 20 may not have a stacked structure.

The invention claimed is:

1. A battery stack structure comprising:
a battery stack comprising multiple battery cells that are spaced from each other;
a cooling air introduction passage adjacent to a first side of the battery stack, the cooling air introduction passage being configured to allow air to flow in the cooling air introduction passage before the air cools the battery stack;
a junction box adjacent to a second side of the battery stack, the junction box being configured to allow the air to flow in the junction box after the air has cooled the battery stack, the junction box containing an electronic device; and
a bus bar contained in the junction box, the bus bar being electrically and thermally coupled to the electronic device, the bus bar being configured to allow passing of current that is charged to or discharged from the battery stack, wherein
a direction of a flow of the air flowing from the battery stack into the junction box faces a major surface of the bus bar, and
wherein the junction box is configured to have a laterally outer closed-off wall and an interior laterally positioned opening that is free of a blocking flow enclosure wall such that the direction of the flow of the air flowing from the battery stack into the junction box flows directly, and without redirection channeling, into the major surface of the bus bar.

2. The battery stack structure according to claim 1, wherein the bus bar is disposed upstream of the electronic device along the flow of the air in the junction box.

3. The battery stack structure according to claim 1, wherein the bus bar is inclined from an inner surface of the junction box.

4. The battery stack structure according to claim 2, wherein the bus bar is inclined from an inner surface of the junction box.

5. The battery stack structure according to claim 1, wherein
the battery stack comprises a lower battery stack and an upper battery stack,
the junction box comprises a lower junction box and an upper junction box, the lower junction box being disposed laterally of the lower battery stack, the upper junction box being disposed laterally of the upper battery stack,
the lower junction box contains a lower bus bar that is coupled to either one of a positive electrode and a negative electrode of the battery stack, and
the upper junction box contains an upper bus bar that is coupled to the other of the positive electrode and the negative electrode of the battery stack.

6. The battery stack structure according to claim 1, wherein
the battery stack comprises a lower battery stack and an upper battery stack,
the junction box comprises a lower junction box and an upper junction box, the lower junction box being disposed laterally of the lower battery stack, the upper junction box being disposed laterally of the upper battery stack,
the cooling air introduction passage comprises a lower cooling air introduction passage and an upper cooling air introduction passage, the lower cooling air introduction passage being disposed laterally of the lower battery stack, the upper cooling air introduction passage being disposed laterally of the upper battery stack, and
the lower junction box and the lower cooling air introduction passage each comprise a positioning unit configured to position the lower battery stack and the upper battery stack.

7. The battery stack structure according to claim 1, wherein
the battery stack comprises a lower battery stack and an upper battery stack,
the junction box comprises a lower junction box and an upper junction box, the lower junction box being disposed laterally of the lower battery stack, the upper junction box being disposed laterally of the upper battery stack,
the lower junction box partially protrudes upwardly so as to comprise a protrusion,
the lower junction box comprises a terminal on the protrusion,
the upper junction box has a recess having a shape that allows insertion of the protrusion into the recess, and
the protrusion of the lower junction box is inserted into the recess of the upper junction box.

8. The battery stack structure according to claim 1, wherein the bus bar is partially widened so as to comprise a wide part.

9. The battery stack structure according to claim 2, wherein the bus bar is partially widened so as to comprise a wide part.

10. The battery stack structure according to claim 3, wherein the bus bar is partially widened so as to comprise a wide part.

11. The battery stack structure according to claim 4, wherein the bus bar is partially widened so as to comprise a wide part.

12. A battery stack structure comprising:
a battery stack comprising multiple battery cells arranged as to define space between the battery cells and such that the spaces are spaced apart along a first axis;
a cooling air introduction passage adjacent to a first side of the battery stack, the cooling air introduction passage being configured to introduce cooling air to the first side and into the spaces between the battery cells such that the cooling air travels within the spaces along a second axis perpendicular to the first axis;
a junction box adjacent to a second side of the battery stack and including a first opening and a second opening, the first opening opening toward the cooling air travelling within the spages and past the seeond side while travelling along the second axis, and wherein the second opening is arranged as to have the cooling air travel within the junction box in a direction non-parallel with the second axis;

an electronic device disposed in the junction box; and a bus bar including a plate-like portion disposed in the junction box, the bus bar being electrically and thermally coupled to the electronic device, the plate-like portion including an exposed portion that is exposed to the cooling air that passes through the first opening of the junction box and into contact with the exposed portion while still travelling along the second axis.

13. The battery stack structure according to claim 12, wherein a main surface of the exposed portion of the plate-like portion faces toward the second side of the battery stack.

14. The battery stack structure according to claim 13, wherein the plate-like portion extends substantially parallel to the first axis, and the direction non-parallel with the second axis is parallel with the first axis.

15. The battery stack structure according to claim 14, wherein the electronic device is disposed closer to the second opening than is the exposed portion of the plate-like portion.

16. The battery stack structure according to claim 15, wherein the main surface of the exposed portion is substantially perpendicular to the second axis.

17. A battery stack structure comprising:

a battery stack comprising multiple battery cells arranged as to define spaces between the battery cells and such that the spaces are spaced apart along a first axis;

a cooling air introduction passage adjacent to a first side of the battery stack, the cooling air introduction passage being configured to introduce cooling air to the first side and into the spaces between the battery cells such that the cooling air travels within the spaces along a second axis perpendicular to the first axis;

a junction box adjacent to a second side of the battery stack and including a first opening and a second opening, the first opening opening toward the cooling air travelling within the spaces and past the second side while travelling along the second axis, and wherein the second opening is arranged as to have the cooling air travel within the junction box in a direction non-parallel with the second axis;

an electronic device disposed in the junction box; and a bus bar including a plate-like portion disposed in the junction box, the bus bar being electrically and thermally coupled to the electronic device, wherein a main surface of the plate-like portion of the bus bar is parallel to a plane intersecting the second axis, and wherein, the spaces, the first opening, and the main surface of the plate-like portion are arranged such that the cooling air passes from the spaces, into the first opening, and into contact with the main surface of the plate-like portion while traveling in a common direction along the second axis.

18. The battery stack structure according to claim 17, wherein the plate-like portion extends substantially parallel to the first axis, and the direction non-per parallel with the second axis is parallel with the first axis.

19. The battery stack structure according to claim 18, wherein the electronic device is disposed closer to the second opening than is the plate-like portion.

* * * * *